United States Patent [19]

Wiley, Jr. et al.

[11] Patent Number: 4,855,712
[45] Date of Patent: Aug. 8, 1989

[54] METHOD AND APPARATUS FOR MONITORING BRAKE CONDITIONS OF A MOTOR VEHICLE

[75] Inventors: Nathaniel C. Wiley, Jr., Weston; William L. Jensen, Jr., Beacon Falls, both of Conn.

[73] Assignee: Rudkin-Wiley Corporation, Bridgeport, Conn.

[21] Appl. No.: 11,165

[22] Filed: Feb. 5, 1987

[51] Int. Cl.$^4$ .............................. B60Q 9/00
[52] U.S. Cl. ................................... 340/453
[58] Field of Search ............ 340/52 A, 52 B, 69, 340/527, 636, 693, 58; 188/1.11; 116/208

[56] References Cited

U.S. PATENT DOCUMENTS

| | | | |
|---|---|---|---|
| 3,805,228 | 4/1974 | Peeples | 340/52 A |
| 3,938,117 | 2/1976 | Bozoian | 340/527 |
| 4,020,454 | 4/1977 | Malonee | 340/52 B |
| 4,059,823 | 11/1977 | Martin et al. | 340/58 |
| 4,306,230 | 12/1981 | Forss et al. | 340/636 X |
| 4,488,115 | 12/1984 | Podhrasky | 340/636 X |
| 4,513,277 | 4/1985 | Moore et al. | 340/527 X |
| 4,547,770 | 10/1985 | Suzuki et al. | 340/636 |
| 4,583,071 | 4/1986 | Sebalos et al. | 340/52 B |
| 4,642,603 | 2/1987 | Martinez, Jr. | 340/52 B |
| 4,757,300 | 7/1988 | Sebalos | 340/52 B |

FOREIGN PATENT DOCUMENTS

| | | |
|---|---|---|
| 387941 | 2/1933 | United Kingdom . |
| 639732 | 7/1950 | United Kingdom . |
| 1311088 | 3/1973 | United Kingdom . |
| 1311089 | 3/1973 | United Kingdom . |
| 1387807 | 3/1975 | United Kingdom . |
| 1387808 | 3/1975 | United Kingdom . |
| 1512003 | 5/1978 | United Kingdom . |

OTHER PUBLICATIONS

Brake Alert Systems, Inc.-Installation and Adjustment Guide.
Brake Alert-Advertisements and Newsletters.
"SAM" Keeps Watch-Heavy Duty Trucking, Mar., 1986, p. 87.

Primary Examiner—Joseph A. Orsino
Assistant Examiner—Brian R. Tumm
Attorney, Agent, or Firm—Mark P. Stone

[57] ABSTRACT

The method and apparatus provides an improved system for monitoring air brakes of a motor vehicle and providing the operator with a signal when brake adjustment or repair is required. A permanent magnet is mounted to a slack adjuster or push rod for air brakes of the vehicle and the magnet is moveable with the rod. A housing containing a magnetically actuated switch, a power supply and an audible single generator is fixedly mounted relative to the push rod. As the magnet on the push rod is moved within a predetermined distance of the fixed housing, the magnetically actuated switch actuates the audible signal generator to produce a warning signal indicating that brake adjustment is required. The system has its own electrical power supply which operates independently from other electrical systems in the vehicle and therefore does not depend upon the electrical power of the vehicle itself for proper operation. The system may include additional circuitry to delay actuation of the audible signal or to deactuate the audible signal after a predetermined period of time for the purpose of conserving the independent power supply.

34 Claims, 4 Drawing Sheets

METHOD AND APPARATUS FOR MONITORING BRAKE CONDITIONS OF A MOTOR VEHICLE

BACKGROUND OF THE INVENTION

The present invention is directed to method and apparatus for monitoring the brakes of a motor vehicle and providing a warning signal when brake adjustment or repair is needed.

Systems of the type described above are generally known to the art and are illustrated by U.S. Pat. No. 4,583,071 issued to Sebalos et al on Apr. 15, 1986, United Kingdom Patent Specification No. 1,387,808, United Kingdom Patent Specification No. 1,512,003 and in a publication entitled Brake Alert Systems, Inc. Installation and Adjustment Guide. In the known systems a permanent magnet is typically mounted to a rod which is moveable in response to depression of a brake pedal by the operator of a motor vehicle. (As known to those familiar with the art, a push rod in an air brake system travels a distance proportional to brake (lining and drum) wear between brake adjustments corresponding to mechanical "slack" in response to depression of the brake pedal by the vehicle operator). A magnetically actuated switch is fixedly mounted relative to the moveable permanent magnet. In the event that the brake rod travels beyond a certain range, the permanent magnet on the moveable rod will be brought sufficiently close to the magnetically actuated switch to cause actuation thereof. The switch is coupled to signal means, as for example a signal light, and actuation of the signal means provides the operator with an indication that brake adjustment is necessary. In motor vehicles having air brakes, the permanent magnet is most commonly mounted to a preexisting push rod which extends from the diaphragm of an air chamber to a preexisting slack adjuster of the braking system.

The known systems, such as those described above, are powered by a connection to the existing electrical power supply for the vehicle. The signal indicators which are typically indicator lights, are installed on the dashboard of the cab.

In practice, the use of the existing electrical system of the vehicle as the power supply for a brake monitoring system, particularly the brakes of a trailer, is disadvantageous for several different reasons. The need to individually wire and electrically connect the brake monitor system to the vehicle power supply is a time consuming and expensive procedure. The running of individual wires through the chassis of a vehicle subjects the wires to damage as the vehicle operates. If a wire is broken, the vehicle operator will not be provided with a brake signal thereby defeating the purpose of the system. Moreover, this type of brake monitor system will not operate if the vehicle battery is dead or if the vehicle ignition switch is not "on".

In addition to the above, there are particular problems when the known brake monitoring systems are installed to monitor the brakes of a trailer of a tractor-trailer vehicle. The connection of such a system to the existing electrical power system of the vehicle and to signal indicator lights in the cab requires substantial wiring which is disadvantageous for the reasons noted above. Additionally, such systems are dependent upon the integrity of the pre-existing electrical contacts between the tractor and trailer which often are not available or reliable. Moreover, the trailer of a tractor trailer is not independently electrically powered, and thus a brake monitoring system will operate only if either the trailer running lights or the brake lights are actuated.

For the reasons discussed above, known brake monitoring systems operating from the existing electrical power supply of a vehicle are disadvantageous and unreliable in many different respects.

It is an object of the present invention to provide a reliable method and apparatus for monitoring the condition of the brakes of a motor vehicle which overcomes the above noted disadvantages of known brake monitoring systems. In particular, it is an object of the present invention to provide a method and apparatus for monitoring the condition of vehicle brakes which does not depend on the existing electrical power system of the vehicle for its operation. In one preferred embodiment of the invention, the brake monitoring system may be installed as a self-contained unit without any external wiring at all. Other objects and advantages of the invention will be apparent from the following description.

SUMMARY OF THE INVENTION

In accordance with the objects of the present invention, a method and apparatus for monitoring the wear adjustment condition of the brakes of a motor vehicle includes a permanent magnet mounted to a push rod which is moveable in response to brake pedal depression, and a housing fixedly mounted relative to the permanent magnet. The push rod in an air brake system moves a distance proportional to mechanical slack in the system which itself is determined by wear. The more worn the brake lining and drum are, the greater distance the push rod will move to compensate for slack. The housing may contain or be connected to a switch such as a magnetically actuated reed switch. The system is adjusted so that when the push rod moves a sufficient predetermined distance in response to brake pedal depression so as to indicate that brake adjustment is necessary, the permanent magnet mounted thereto and moveable therewith is brought sufficiently close to the housing to actuate the switch therein which in turn actuates the audible signal means. The brake monitoring system contains its own independent power supply coupled to the audible signal means within the housing.

In one embodiment of the invention, the switch, audible signal means, and independent power supply are all mounted within the housing which is installed close to the push rod. No independent electrical wiring is necessary to install the monitoring system which operates with its own electrical power source independent of other electrical systems of the vehicle. In other embodiments of the invention, the reed switch may be mounted close to the push rod and electrically coupled by cables to the housing containing the independent electrical power supply and the audible signal means. In all embodiments, the brake monitoring system is not dependent upon the electrical power supply of the vehicle.

The operator of the vehicle is warned of the need for brake adjustment upon hearing the audible signal and no visible indicating means such as signal lights need be installed or wired to the driver's compartment. The self-contained housing may include additional circuitry capable of both momentarily delaying the generation of the audible signal and of automatically deactivating the audible signal after it has been generated for longer than a predetermined time period to extend the life of the alarm power supply. Separate test means may be provided within the housing to monitor the condition of the power supply to alert the operator when replacement is needed.

BEST MODE FOR CARRYING OUT THE INVENTION

Figure 1:
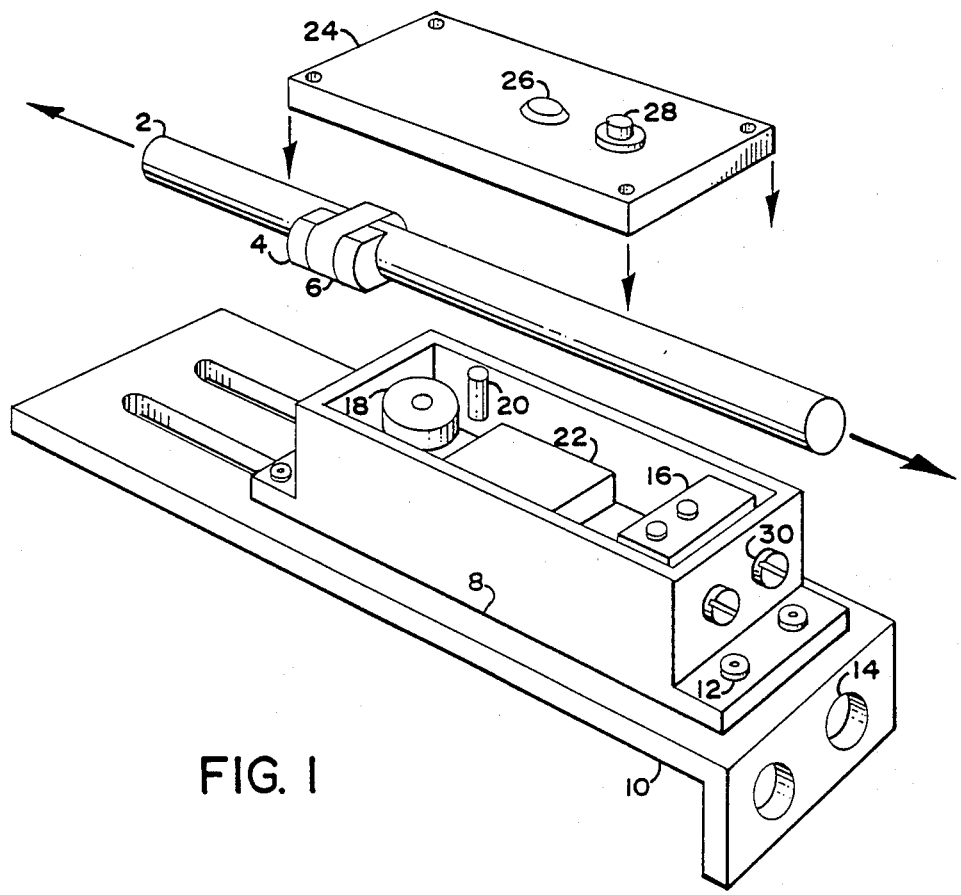
FIG. 1 is a perspective view of a first embodiment of the brake monitoring system of the present invention in which a switch actuator is movably mounted relative to a switch.

The method and apparatus of the present invention for monitoring the condition of the brake system of a motor vehicle will now be discussed with reference to FIGS. 1-3 of the drawing.

Referring first to FIG. 1, a slack adjustor or push rod for a motor vehicle having an air brake system is generally designated by reference numeral 2. The rod is movable in the directions indicated by the arrows. Slack adjustor rods are well known to those skilled in the art. By way of brief background description, when the driver of a vehicle having an air brake system depresses the brake pedal, a brake shoe delivers a force to a brake drum. More specifically, a brake shoe having a lining is received within a brake drum, and traction between the lining and the drum converts the kinetic energy of the moving wheels of the vehicle into heat energy to thereby cause braking. However, a vehicle can only effectively and safely brake if sufficient contact and engagement between the brake shoe and the brake drum are made. If, for example, the lining on the brake shoe received in the brake drum is out of adjustment and/or worn, firm contact or engagement between the brake shoe and the brake drum may not occur as a result of slack between the brake shoe and the brake drum. Because in air brake systems pedal movement is proportional to the air pressure applied to the brake chambers, the vehicle operator must apply additional force to the brake pedal to compensate for slack and obtain the desired vehicle braking. A slack adjuster rod (hereinafter called push rod) is provided to help overcome this problem. In effect, the push rod is movable in response to the distance of travel of the brake pedal of the vehicle when the brakes are applied by the operator. When slack develops between the brake shoe and the brake drum as a result of wear of the brake lining, the push rod is moved a distance so as to firmly urge the brake shoe against the brake drum to compensate for the slack between these elements. The more the lining on the brake shoe has worn, the greater the distance the push rod must move to assure firm engagement between the brake shoe and the brake drum. Accordingly, the extent of movement of the push rod in response to the depression of the brake pedal may be used as an indication of the extent that the lining in the brake drum is out of adjustment and/or worn. Therefore, movement of the push rod beyond a predetermined distance in response to brake pedal depression may accurately reflect the need for brake adjustment or repair. Attention is respectfully invited to a text entitled *Heavy Duty Brake Manual* by GreyRock, the disclosure of which is incorporated herein by reference, for further information relating to background theory and function of braking systems for motor vehicles including slack adjuster rods.

Referring back to FIG. 1 of the drawing, a permanent magnet designated by the reference numeral 4 is mounted around the outer surface of the push rod 2 by a rod clamp 6. The magnet 4 is movable together with the push rod. A housing generally designated by the reference numeral 8 is mounted on an L shaped bracket 10 by a plurality of bolts 12. The bracket 10 is mountable to a brake chamber or any fixed supporting surface by mounting holes 14 so that the housing 8 is fixedly mounted relative to the permanent magnet 4 movable with the push rod 2.

The housing 8 contains an independent power supply such as a battery 16, an audible alarm designated by the reference numeral 18, and a magnetically actuated switch, as for example, a reed switch 20. A circuit board 22 is provided in the housing 8 for controlling the electrical circuitry as will be discussed below. There are no external electrical wires extending from the housing 8 because the housing provides a self-contained alarm unit having its own independent internal electrical power supply and because the alarm is audible so that no electrical wiring is required to provide any visible alarm indicator light proximate to the operator.

A cover designated by the reference numeral 24 is mountable over the open top of the housing 8. The cover includes a light 26 and a test button 28 extending from the outer surface thereof. When the cover is mounted on the housing, the push button may be depressed to actuate the light which indicates the power level of the independent power supply 16 within the housing. Plugs 30 cover openings defined in the ends of the housing 8. These plugs may be removed to expose the openings for cable connections as will be discussed with respect to FIG. 3.

The operation of the system disclosed in FIG. 1 will now be described. When the operator of the vehicle depresses the brake pedal, the push rod 2 moves as described above. The permanent magnet 4 moves with the rod. As also described above, the full extent of movement of the rod depends on the condition of the brake lining in the brake drum. The more that the brake lining is worn, the greater distance the rod will travel in response to depression of the brake pedal by the operator of the vehicle. The permanent magnet 4 is mounted to the push rod 2 in a position on the rod which will bring the magnet sufficiently close to the housing 8 to actuate the reed switch 20 only when the distance that the rod moves in response to depression of the brake pedal is sufficiently great to indicate that the brake lining is worn and requires adjustment or that some other problem exists in the brake system. (If the brake system is in satisfactory condition, the distance that the push rod moves in response to depression of the brake pedal will not be sufficient to bring the permanent magnet close enough to the reed switch in the housing 8 to actuate the switch and the audible alarm). When the operator of the vehicle hears the audible alarm upon depression of the brake pedal, he will be alerted to the fact that the brake system requires attention. As will be discussed in greater detail below, a timer is provided in the circuit board 22 within the housing 8 so that the audible alarm may sound for a sufficiently long time (e.g. five minutes) after the magnetically initially actuated reed switch is actuated to assure that the operator of the vehicle will hear the alarm.

It becomes apparent from the above description that the brake monitoring system of the present invention may be readily installed in the brake system of a motor vehicle quickly, inexpensively and with significantly less labor than is required by the known systems discussed above. The unit is self contained and requires no independent external electrical wiring or connections to the existing electrical system of the vehicle. Accordingly, both the time and materials necessary to install and maintain the present system are significantly reduced because the system includes its own independent electrical power source. More importantly, because the system is self contained and requires no independent or external wiring, the system does not run the risk of failure as a result of broken wiring run through the chassis of a vehicle, and therefore requires considerably less maintenance than the known brake monitoring systems. The only anticipated maintenance required of the system is the periodic replacement of the independent power supply.

Figure 1A:
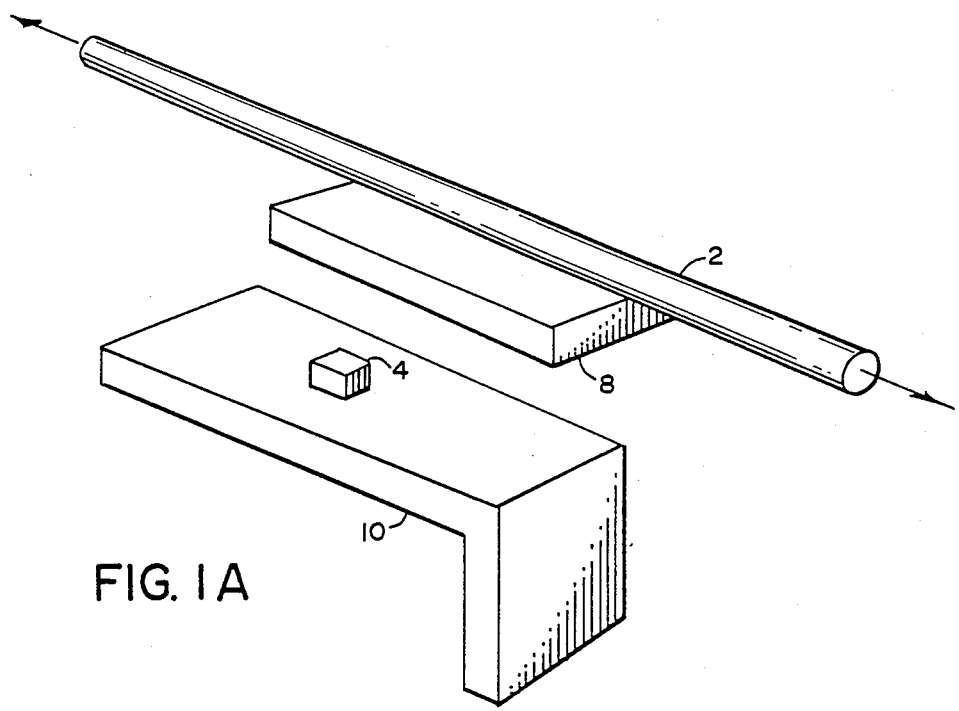
FIG. 1A is a perspective view of a second embodiment of the brake monitoring system of the present invention in which a switch is movably mounted relative to a switch actuator.

The system illustrated by a FIG. 1 of the drawings mounts the permanent magnet to the movable push rod 2 and fixedly mounts the housing 8, including the alarm means and the magnetically actuated switch, relative to the movable permanent magnet. However, it is equally within the scope of the invention to reverse this orientation by mounting the housing 8 to the push rod 2 for movement therewith while the permanent magnet 4 is fixedly mounted relative to the movable housing as shown in FIG. 1A. Moreover, although the permanent magnet is shown mounted to a slack adjuster or push rod, it may be mounted to any component of the brake system which provides movement of the permanent magnet relative to the magnetically actuated switch a distance corresponding to the extent that a brake pedal must be moved in order to effectively engage the braking system of the vehicle.

Figure 2:
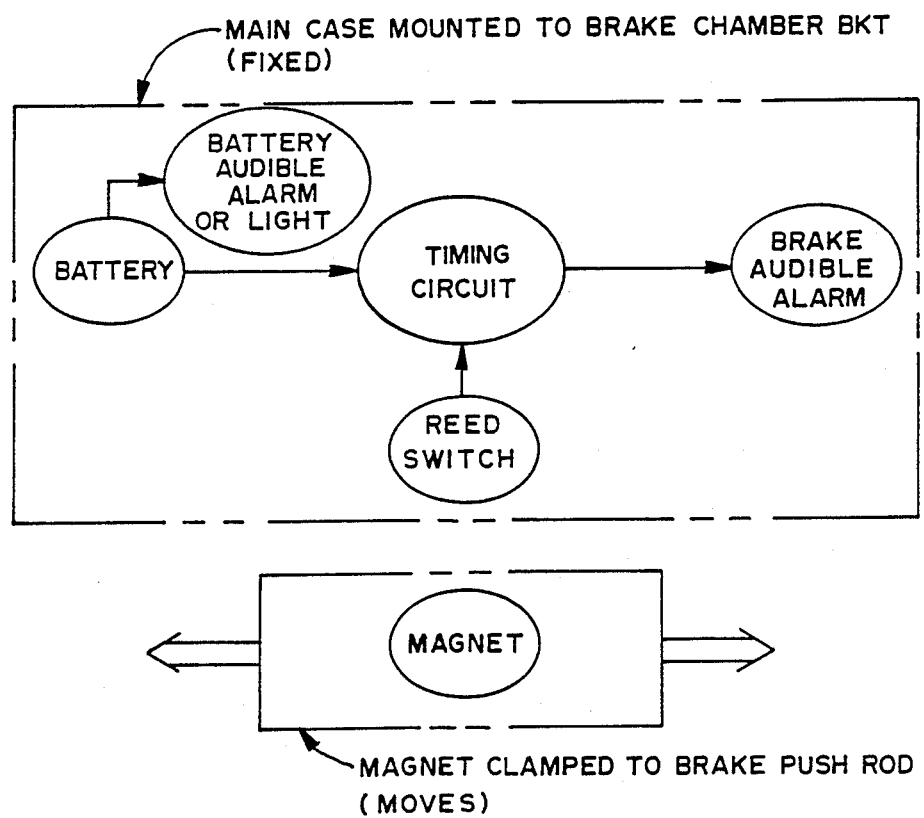
FIG. 2 is a schematic diagram of the electrical circuitry of the system of FIG. 1.

FIG. 2 of the drawings represents a schematic diagram of the electrical system contained within the housing 8. The electrical system includes an independent power supply such as a battery coupled to an audible alarm. A magnetically actuated reed switch is electrically coupled to a timing circuit disposed between the battery and the audible alarm. When the reed switch is actuated by the permanent magnet 4 (see FIG. 1), the timing circuit between the battery and the audible alarm is triggered. The alarm may immediately sound upon actuation of the reed switch. In the alternative, an initial delay period (e.g. 15 seconds) may be employed. A delay timing circuit may be provided to assure that the audible alarm will not sound unless the switch has been actuated for more than a predetermined time. This will occur only when the brakes are depressed for a time in excess of the delay period and depression of the brakes actuates the switch. If the brakes are released prior to this time period, the alarm will not sound even though the switch has been actuated. If the delay period is exceeded, the alarm sounds for as long as the brake pedal is depressed. In the event that the brake pedal remains depressed for more than a predetermined time period (as for example when the vehicle is parked), the timer will monitor this period and automatically turn the alarm off. In this manner, the independent alarm power supply is preserved. Therefore, even if the brakes were not applied long enough to sound the alarm during operation of the vehicle, the driver will be able to hear the audible signal when the vehicle is parked and the brakes are applied after the vehicle's engine has been turned off. The timers required to perform the above described functions are conventional and well known to the art.

As noted in the discussion of FIG. 1, a light 26 and pushbutton 28 are mounted on the housing cover 24 to test the power supply (battery) within the housing. In addition to or in lieu of this test means, a second audible alarm may be electrically coupled to the independent battery in the housing to directly monitor the condition of the battery. This second audible alarm will be actuated when the battery is nearly depleted and requires imminent replacement. The audible signal provided by the second alarm will be distinct in sound from that of the first alarm so that the operator of the vehicle may readily perceive the difference between the two. Timing means may also be provided so that this second alarm sounds only periodically to avoid a continuous drain on an already weakened battery. Preferably, the independent power supply used in the housing will be a Lithium battery which is capable of providing electrical current at a temperature as low as $-40°$ F. with an anticipated useful life of five to eight years. Accordingly, the need to replace the battery will occur only on an infrequent basis or possibly not at all, depending on the life of the vehicle.

The preferred embodiment of the invention employs a magnetically actuated reed switch and a magnetic switch actuator to provide remote switching. It is also within the scope of the invention to utilize alternate switching means such as a mechanical switch and switch actuator, flow transducers, resistive switching, capacitive switching, optical switching, or magnetic Hall effect switching.

Figure 3A:
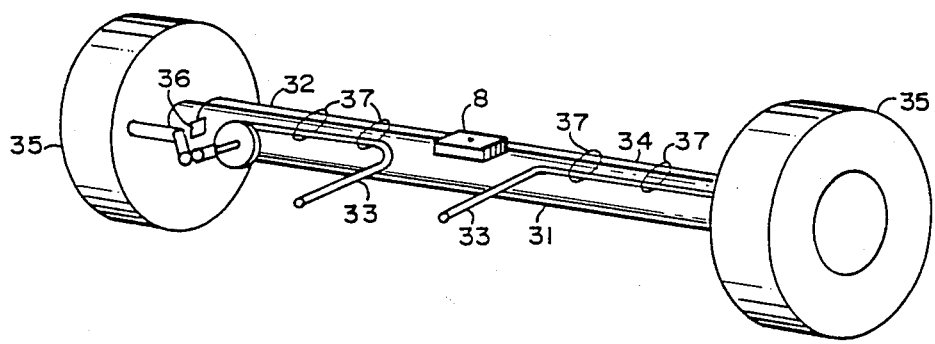
FIG. 3A is a perspective view of the system disclosed in FIG. 3 mounted to the axle of a vehicle.
Figure 3:
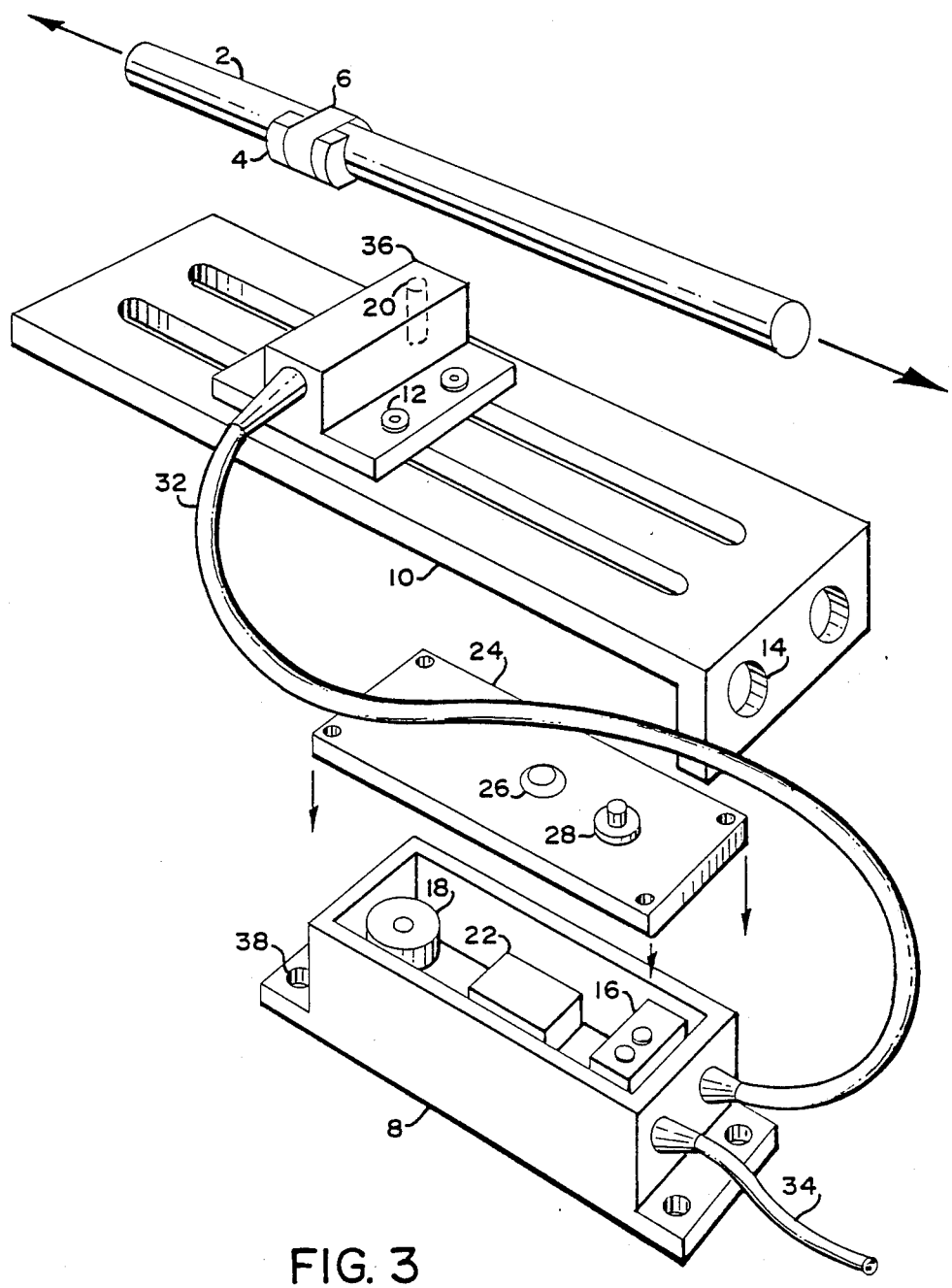
FIG. 3 is a perspective view of a third embodiment of the invention in which a single housing is employed to monitor more than a single brake.

FIG. 3 of the drawings illustrate a slightly modified embodiment of the brake monitoring system of the present invention. The same reference numerals are used for structure in FIG. 3 which corresponds to structure of FIG. 1. The embodiment disclosed by FIG. 3 provides a single housing 8 which may be used to monitor a plurality of different individual brakes for different wheels on the motor vehicle. Referring to FIG. 3, the housing 8 contains an audible alarm 18 and an independent electrical power supply 16 (a battery), similar to that which was discussed with respect to FIGS. 1 and 2. However, unlike the first embodiment, the housing 8 does not contain any switch means. On the contrary, electrical cables 32 and 34 integrally extend from the sidewalls of the housing 8. In the alternative, waterproof connectors may be used. The electrical cables each terminate at, and are integrally attached to, different reed switches 20 enclosed within separate housings 36 mounted on different L-shaped brackets 10 proximate to the push rods 2 of the different brakes to be monitored. The housing 8 containing the power supply 16, the audible signal means 18 and the circuit board 22 is electrically connected to the other ends of the cables 32, 34, and the housing itself is mounted via bolt holes 38 on a fixed supporting surface remote from the reed switches 20. In this manner, a single housing 8 may be used to monitor a plurality of different brake push rods 4.

In the FIG. 3 embodiment, the electrical cables 32, 34 may be clamped to and run together with the pre-existing air hoses of the vehicle which provide suitable supporting means for the cables. As shown in FIG. 3A, the alarm housing 8 is mounted to a vehicle axle 31, and cables 32 and 34 are run along the axle together with pre-existing air hose lines 33 towards vehicle wheels 35. The alarm cables 32 and 34 are held together with the air hoses 33 by ties 37. The cables 32 and 34 terminate in the switch housings 36 mounted on the axle proximate to the wheels. In both the FIG. 1 and FIG. 3 embodiments of the invention, the housing 8 (FIG. 1) or the housing 36 (FIG. 3) are movable mounted on slots in the bracket 10 so the position of the switch may be adjusted relative to the permanent magnet 4 on the push rod 2.

The basic difference between the embodiment of the invention disclosed by FIG. 1 and that disclosed by FIG. 3 is that the latter embodiment of the invention utilizes a single common power supply and alarm to monitor more than a single brake. Therefore, the latter embodiment reduces costs and labor in the installation of the system since a fewer number of components are required to be installed. Moreover, the latter embodiment reduces the overall weight and space of the system which is advantageous when retrofitting the system to a preexisting motor vehicle. Although the first embodiment of the invention advantageously eliminates all external wiring, it requires that a separate housing containing a switch, power supply and audible alarm means be mounted proximate to each individual brake to be monitored. Both embodiments of the invention advantageously eliminate the need to connect the brake monitoring system into the existing electrical system of the vehicle.

In both embodiments of the invention, it is preferable that the switch utilized in the system be a magnetic reed switch, and the switch actuator be a permanent magnet. The reed switch may be normally in an open position when no alarm condition exists, and may be switched into a closed position to actuate the alarm. However, it may be preferable to provide the switching system in reverse order so that the reed switch is normally closed when no alarm conditioning exists, and is opened by the switch actuator to actuate the alarm. This may be accomplished by using an electrical relay or other suitable means. In this manner, the alarm of the present invention will not only sound as a result of brake wear, but will also be actuated in the event that any of the electrical circuitry or wiring of the system malfunctions. Although this switching concept may be used advantageously in both embodiments of the invention, it is particularly useful in the second embodiment of the invention which includes two or more integral electrical cables extending beyond the main housing.

It is evident that other modifications and variations within the scope of the invention described herein will become apparent to those skilled in the art. The embodiments of the invention described above are intended to be illustrative only, and not restrictive of the scope of the invention, that scope defined by the following claims and all equivalents thereto.

We claim:

1. In a system for monitoring the condition of brakes of a motor vehicle, said system including switch means electrically coupled to alarm means, and switch actuator means operatively associated with the braking system of the motor vehicle for providing relative movement between said switch means and said switch actuator means in response to movement of a brake pedal of said vehicle for actuating said switch means and said alarm means when said braking system requires adjustment or repair, the improvement comprising;
    an independent power supply coupled to said switch means for actuating said alarm means in response to said actuation of said switch means so that said alarm means is not powered by any pre-existing electrical power supply of said motor vehicle, said alarm means including an audible signal generator, and
    second alarm means coupled to said independent power supply for monitoring the condition of said independent power supply and providing a signal when said independent power supply is depleted below a predetermined level.

2. The system of claim 1 wherein said switch means, said alarm means and said independent power supply are enclosed within a single housing having no external electrical wiring extending therefrom.

3. The system as claimed in claim 1 further including timing means disposed between said switch means and said alarm means for preventing actuation of said alarm unless said switch means has been actuated for longer than a predetermined time period.

4. The system of claim 1 wherein said switch means includes a magnetically actuated switch and said switch actuator means includes a permanent magnet.

5. The system of claim 4 wherein said permanent magnet is mounted to and movable with a push rod of said motor vehicle and said magnetically actuated switch is fixedly mounted relative to said movable permanent magnet.

6. The system as claimed in claim 1 wherein said independent power supply is a battery.

7. The system as claimed in claim 1 wherein said second alarm means includes a second audible signal generator for providing an audible signal different from that of said first alarm means.

8. In a system for monitoring the condition of brakes of a motor vehicle, said system including switch means electrically coupled to alarm means, and switch actuator means operatively associated with the braking system of the motor vehicle for providing relative movement between said switch means and said switch actuator means in response to the movement of a brake pedal of said vehicle for actuating said switch means and said alarm means when said braking system requires adjustment or repair, the improvement comprising;
    a single unit for monitoring a plurality of brakes of a motor vehicle, said single unit including a housing containing an independent power supply coupled to said alarm means, said independent power supply being a battery,
    a plurality of electrical cables, each of said cables having one end connected to said housing and being electrically coupled to said alarm means and independent power supply therein, said switch means being connected to the other ends of said electrical cables,
    each of said switch means being mounted proximate to different brakes for actuation by said switch actuator means.

9. The system as claimed in claim 8 wherein said plurality of electrical cables are mounted to air hoses of said motor vehicle.

10. The system as claimed in claim 8 wherein said alarm means is an audible alarm.

11. The system as claimed in claim 8 in which said switch means are magnetically actuated switches and said switch actuator means are permanent magnets.

12. The system as claimed in claim 8 wherein said switch means are normally closed when no alarm condition exists, and said switch means are opened by said switch actuator means when an alarm condition exists.

13. A system for monitoring the condition of brakes of a motor vehicle including:
a permanent magnet mounted to a push rod of said motor vehicle and movable therewith in response to depression of a brake pedal of said motor vehicle,
a housing fixedly mounted relative to said movable push rod, said housing including an independent power supply and an audible alarm,
said housing being mounted relative to said permanent magnet such that said magnet will actuate a switch only if said push rod moves a predetermined distance relative to said fixed housing, said switch being a magnetically actuated switch which is electrically connected between said independent power supply and said audible alarm;
said independent power supply, said audible alarm and said magnetically actuated switch being contained within said housing to eliminate any external wiring extending from said housing,
said system not being coupled to any electrical power supply of said motor vehicle.

14. The system as claimed in claim 13 further including timing means disposed between said power supply and said magnetically actuated switch for preventing said audible alarm from sounding until a predetermined time period after said switch has been actuated.

15. The system as claimed in claim 13 further including second audible alarm means coupled directly to said power supply for sounding an alarm when said power supply is depleted below a predetermined level.

16. The system as claimed in claim 15 wherein said first audible alarm and said second audible alarm means are different in sound.

17. A method of monitoring the condition of the brakes of a motor vehicle including the steps of:
enclosing an independent power supply and first alarm means in a single housing,
mounting a switch actuator to a push rod of said motor vehicle movable in response to depression of a brake pedal of said motor vehicle, and mounting said housing fixedly relative to said push rod, for causing relative movement between said single housing and said switch actuator in response to depression of said brake pedal of said motor vehicle,
actuating said first alarm means when said switch actuator is within a predetermined distance from a switch electrically connected between said power supply and said first alarm means to indicate that brake repair or adjustment is required.

18. The method of claim 17 wherein said switch is magnetically actuated and said switch actuator is a magnet.

19. The method of claim 18 wherein said switch is a reed switch.

20. The method of claim 17 including the steps of timing the time that said switch actuator is within said predetermined distance from said switch, and causing said first alarm means to be actuated only after said switch actuator is within said predetermined distance for greater than a first predetermined time.

21. The method of claim 17 further including the step of monitoring the condition of said power supply in said housing.

22. The method of claim 21 further including the step of actuating a second alarm when said power supply is depleted below a predetermined level.

23. The method of claim 22 wherein said alarm is a second audible alarm different in sound from said first alarm means.

24. The method of claim 17 wherein said first alarm means is a first audible alarm.

25. In a system for monitoring the condition of brakes of a motor vehicle, said system including switch means electrically coupled to alarm means, and switch actuator means operatively associated with the braking system of the motor vehicle for providing relative movement between said switch means and said switch actuator means in response to movement of a brake pedal of said vehicle for actuating said switch means and said alarm means when said braking system requires adjustment or repair, the improvement comprising;
an independent power supply coupled to said switch means for actuating said alarm means in response to said actuation of said switch means so that said alarm means is not powered by any pre-existing electrical power supply of said motor vehicle,
said switch means, said alarm means and said independent power supply being enclosed within a single housing having no external electrical wiring extending therefrom,
said housing being mounted to and movable with a push rod of said motor vehicle and said switch actuator means being fixedly mounted relative to said movable housing.

26. The system as claimed in claim 25 wherein said switch means include a magnetically actuated switch and said switch actuator means is a permanent magnet.

27. A method of monitoring the condition of the brakes of a motor vehicle including the steps of:
enclosing an independent power supply and first alarm means in a single housing,
mounting said housing to a push rod movable in response to depression of a brake pedal of said motor vehicle, and mounting a switch actuator fixedly relative to said push rod, for causing relative movement between said single housing and said switch actuator in response to depression of said brake pedal of said motor vehicle,
actuating said first alarm means when said switch actuator is within a predetermined distance from a switch electrically connected between said power supply and said first alarm means to indicate that brake repair or adjustment is required.

28. The method of claim 27 including the steps of timing the time that said switch actuator is within a predetermined distance from said housing, and causing said first alarm means to be actuated only after said switch actuator is within said predetermined distance for greater than a first predetermined time.

29. The method of claim 27 further including the step of monitoring the condition of said power supply in said housing.

30. The method of claim 29 further including the step of actuating a second alarm when said power supply is depleted below a predetermined level.

31. The method of claim 30 wherein said second alarm means is a second audible alarm different in sound from said first alarm means.

32. The method of claim 27 wherein said switch is magnetically actuated and said switch actuator is a magnet.

33. The method of claim 32 wherein said switch is a reed switch.

34. The method of claim 27 wherein said first alarm means is a first audible alarm.

* * * * *